United States Patent Office 2,765,332
Patented Oct. 2, 1956

2,765,332

STABILIZED ALPHA-CYANOACRYLATE ADHESIVE COMPOSITIONS

Harry W. Coover, Jr., and Joseph B. Dickey, Kingsport, Tenn., assignors to Eastman Kodak Company, Rochester, N. Y., a corporation of New Jersey No Drawing. Application February 11, 1954,
Serial No. 409,756

7 Claims. (Cl. 260—464)

This invention relates to adhesive compositions and is particularly concerned with adhesive compositions comprising an ester of α-cyanoacrylic acid having improved stability.

It is desirable to have adhesive compositions which can be used for bonding all kinds of articles such as glass, metals, plastics, rubber, wood, cement, paper, cloth, and the like to themselves or to each other with a high-strength adhesive bond. Such adhesive compositions are the α-cyanoacrylic acid esters as described in the copending application of Harry F. Coover, Jr., and Newton H. Shearer, Jr., Serial No. 318,325, filed November 1, 1952. The adhesive compositions disclosed in this copending application are monomeric esters of α-cyanoacrylic acid, wherein the ester group is either an alkyl group of from 1 to 16 carbon atoms, a cyclohexyl group, or a phenyl group. These monomeric esters can be spread in a thin film on the surface of the articles to be bonded together and polymerized rapidly at room temperature, and without the use of a catalyst, to give adhesive bonds of great strength. Because of the inherent tendency of these monomeric esters of polymerize, the shelf stability of the adhesive compositions has been a problem. Heretofore, the monomer compositions have been stabilized by the inclusion therein of a gaseous inhibitor which is preferably sulfur dioxide, but which can be hydrogen fluoride or nitric oxide. Such inhibitors do not interfere with the formation of the adhesive bond and provide a degree of stability, particularly when the adhesive composition is kept in a cool place. It is desirable, however, to increase the shelf stability of such compositions without slowing down the speed of the bonding reaction or necessitating the use of elevated temperatures or catalysts during the polymerization.

It is accordingly an object of the invention to provide adhesive compositions containing improved stabilizing materials incorporated therein, whereby the shelf stability of the compositions is greatly improved without impairing the speed or strength of the adhesive bonding.

Another object of the invention is to provide new and improved adhesive compositions comprising monomeric esters of α-cyanoacrylic acid, having a higher degree of stability than was obtainable heretofore with readily polymerizable compositions of this kind.

Another object of the invention is to provide α-cyanoacrylate adhesive compositions which can be stored at room temperature or higher for prolonged periods of time without polymerization and without impairing the adhesive action of the composition.

Other objects will be apparent from the description and claims which follow.

These and other objects are attained by means of this invention, which comprises adhesive compositions containing a monomeric ester of α-cyanoacrylic acid having the formula

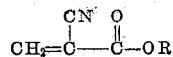

wherein R is a member of the group consisting of alkyl groups of 1 to 16 carbon atoms, cyclohexyl groups, and phenyl groups, and containing as a stabilizer a mixture of sulfur dioxide and hydroquinone. Unlike our previously known compositions, the compositions embodying this invention can be stored at room temperatures or at temperatures well above room temperature in closed containers without polymerization over long periods of time.

The monomeric α-cyanoacrylic acid esters which are employed in practicing the invention can be prepared by reacting esters of cyanoacrylic acid with formaldehyde in aqueous solution in the presence of a basic condensation catalyst, as described in U. S. Patent 2,467,927 of April 19, 1949. The α-cyanoacrylic acid esters can also be obtained as described in U. S. Patent 2,467,926 of April 19, 1949, by reacting an alkyl, cyclohexyl, or phenyl cyanoacetate first with an alkali metal alcoholate, and then with a compound of the formula $ROCH_2X$, in which X is a halogen atom and R is an alkyl, cyclohexyl, or phenyl group. The product obtained by these and similar reactions is a polymer of α-cyanoacrylate, which is then depolymerized by heating the polymer in the presence of phosphorous pentoxide or similar depolymerization catalyst. The monomeric ester thus formed is preferably stabilized by introducing a gaseous inhibitor such as nitric oxide or preferably sulfur dioxide into the monomeric vapors before condensation.

In practicing this invention, the depolymerization is preferably effected in the presence of sulfur dioxide, whereby the sulfur dioxide remains in the monomer and the hydroquinone can then be added thereto. Any of the esters of α-cyanoacrylic acid included within the structural formula can be used in practicing the invention. The preferred esters are the lower alkyl esters, wherein R contains from 1 to 4 carbon atoms, such as the methyl, ethyl, propyl and butyl esters, although the higher alkyl esters, such as the palmityl esters or similar alkyl esters having up to 16 or more carbon atoms, can be employed, as well as the cyclohexyl or phenyl esters.

In accordance with this invention, the monomeric ester is stabilized by inclusion therein of a mixture of sulfur dioxide and hydroquinone. Usually it is desired to prepare compositions which can be used at room temperature without the necessity of either heating or catalysis. Alkaline materials readily catalyze the polymerization of the monomeric esters, and their polymerization is also greatly accelerated by the use of elevated temperatures. One of the primary advantages of the compositions embodying this invention, however, is the fact that they can be used to form high-strength bonds by merely spreading the adhesives in a thin film on the surface to be bonded. If heat and catalysts are to be used during the bonding operation, the amounts of sulfur dioxide and hydroquinone employed in the compositions can be varied over rather wide limits. Thus, for example, concentrations of sulfur dioxide as high as about 2 percent by weight based on the weight of the monomer can be employed, whereupon part of the sulfur dioxide is driven off by warming the adhesive composition prior to use. In most cases, however, it is desirable to maintain the concentration of the sulfur dioxide in the range of from about 0.001% to about 0.01% by weight in order to attain rapid bonding at room temperatures. By the use of hydroquinone in admixture with the sulfur dioxide, it is not necessary to employ larger amounts of sulfur dioxide in order to achieve satisfactory stabilization during storage.

The concentration of hydroquinone in the compositions embodying this invention is desirably maintained below about 0.05% by weight based on the weight of the monomeric ester in order that the bonding time will not be unduly prolonged. As in the case of the sulfur dioxide, however, the quantity of hydroquinone can be greater than 0.05% if heat or catalyst is to be used in the bonding operation. Usually, however, it is desirable that the concentration of hydroquinone in the adhesive composition be maintained in the range of from about 0.001% to about 0.05% by weight based on the weight of the monomeric ester.

With the concentrations of the sulfur dioxide and hydroquinone within these preferred ranges, the adhesive compositions can be stored for prolonged periods at temperatures well above ordinary room temperature without danger of polymerization. The adhesive compositions which show such excellent stability exhibit the anomalous characteristic of bonding within a few seconds when spread in a thin film at room temperature. Thus by means of this invention, the stability of the adhesive compositions when maintained in closed vessels is greatly increased without deleteriously affecting the adhesive properties of the compositions or their utility at ordinary temperatures.

In effecting bonding of two articles using the compositions embodying this invention, the composition is applied in a thin layer to one surface of the material to be bonded, and the other piece to be bonded is then placed in firm contact with the other surface. Upon contact of the two surfaces, an almost instantaneous, high-strength bond is formed. The ease of fabrication and the speed with which high-strength bonds are formed without the use of elevated pressures, solvents, and the like are of tremendous industrial importance. Highly tenacious bonds are produced using very thin films of the adhesive composition. The low viscosity of the monomeric cyanoacrylates is of importance in bonding non-porous materials, since they give excellent surface penetration and readily spread out to very thin liquid films. When bonding porous materials, it is sometimes desirable to increase the viscosity of the inherent composition. This can be readily effected by incorporating in the adhesive composition a minor proportion of a polymeric material such as polymeric alkyl cyanoacrylates, polyacrylates, polymethacrylates, cellulose nitrate, cellulose acetate, cellulose propionate, cellulose butyrate, and other similar cellulose esters or other polymeric materials which are soluble in the monomer. The amount of such polymeric material can be as high as 25 percent of the weight of the composition without adversely affecting the adhesive characteristics of the composition.

Although it is desirable to employ clean surfaces for bonding, the compositions embodying this invention do not require the degree of cleanliness which is necessary with most other adhesives. One of the biggest advantages of the compositions embodying this invention is the fact that no volatile material is present which must be driven off during a long curing time. Since heat and pressure are not generally required to attain a high-strength bond, large assemblies can be readily fabricated, as well as assemblies of such shape that the application of heat or pressure is difficult.

The adhesive bonds formed with these adhesive compositions have a high degree of optical clarity and water resistance. Consequently, the compositions can be used for a great variety of applications such as, for example, the cementing of lenses, the fabrication of waterproof plywood, use in dental fillings, the fabrication of mechanical and structural assemblies, the bonding of brake linings, and many other applications.

The invention is illustrated by the following examples. These examples are included for purposes of illustration and are not intended to limit the scope of the invention unless otherwise specifically indicated.

*Example 1*

Methyl α-cyanoacrylate containing 0.002% sulfur dioxide and 0.05% hydroquinone was heated in a closed container at 65° C. for 72 hours. No observable polymerization occurred during this heating. The resulting fluid composition was still an active adhesive which could be used for bonding glass, wood, metal, plastics, and similar materials.

*Example 2*

The necessity of employing a mixture of sulfur dioxide and hydroquinone in order to achieve good physical stability at elevated temperatures was illustrated when a composition comprising methyl α-cyanoacrylate containing 0.002% sulfur dioxide and no hydroquinone was heated in a closed container at 65° C. for 30 hours. A clear polymeric gel resulted which could not be used as an adhesive.

*Example 3*

An adhesive composition consisting of methyl α-cyanoacrylate containing 0.001% sulfur dioxide and about 0.01% hydroquinone was heated in a closed vessel at 40° C. for 162 hours. The monomer remained a clear, colorless fluid which was an active adhesive. Only a slight turbidity resulted when the same monomer composition was heated at 40° C. for 498 hours. This temperature is, of course, higher than is ordinarily encountered during storage even during summer weather. It is therefore apparent that the compositions embodying this invention can readily be stored at room temperatures for prolonged periods of time without danger of the adhesive compositions setting up.

*Example 4*

Methyl α-cyanoacrylate containing 0.001% sulfur dioxide and no hydroquinone was heated in a closed vial at 60° C. for 20 hours. A milky, polymeric gel resulted.

*Example 5*

The sulfur dioxide-hydroquinone mixtures also stabilize the other α-cyanoacrylate monomers in the same fashion. Thus an adhesive composition containing ethyl α-cyanoacrylate together with 0.001% sulfur dioxide and 0.01% hydroquinone was heated at 40° C. for 498 hours. At the end of this time the composition remained a clear, colorless fluid which was active as an adhesive.

*Example 6*

The lower alkyl esters of α-cyanoacrylic acid polymerize more readily than the higher esters. However, when ethyl α-cyanoacrylate containing only 0.001% sulfur dioxide and no hydroquinone was heated at 60° C. for 20 hours, a polymeric gel resulted.

*Example 7*

An adhesive composition comprising cyclohexyl α-cyanoacrylate containing 0.001% sulfur dioxide and 0.001% hydroquinone remained monomeric after being heated at 40° C. for 162 hours. A similar composition containing the sulfur dioxide but no hydroquinone polymerized to a clear polymeric gel when heated at 60° C. for 20 hours in a closed vial. The inherent instability of the cyanoacrylate monomer is illustrated by the fact that pure methyl α-cyanoacrylate containing no inhibitor underwent a violent exothermic polymerization reaction after 5 minutes at 40° C.

In practicing this invention, the monomer forms a major proportion of the adhesive composition. In some cases, it may be desirable to use mixed esters of the α-cyanoacrylic acid, or to use mixtures of the monomer with another readily polymerizable monomer which is not ordinarily useful as an adhesive alone. In this latter case, the other monomer must be a neutral material in order that it does not either inhibit the polymerization or promote premature polymerization. In some cases, it may also be desirable to incorporate one or more of the well known ester plasticizers into the adhesive composition in order to reduce any possible brittleness of the adhesive bond after prolonged periods.

The utility of the adhesive compositions embodying this invention is illustrated by the fact that two pieces of plate glass can be adhered together using only a single drop of the adhesive composition for bonding. The bond forms within a few seconds, at which time the glass cannot be pried apart, and even when broken, the cemented portions remain attached as in the case of "safety glass." The adhesive compositions can be used for cementing together a variety of materials. Thus, for example, aluminum or iron can be cemented together, or cemented to dissimilar materials such as glass, porcelain, or the like. The fibrous materials such as wood, cloth, paper, and the like are, of course, readily bonded by means of this invention to give durable water resistant bonds which cannot be broken apart without injuring the material being bonded.

Although it is usually not necessary, the adhesive composition can contain more than 0.01% by weight of sulfur dioxide. This is particularly true when an excess amount of sulfur dioxide is used during the depolymerization reaction. In this event, it may be desirable to reduce the sulfur dioxide concentration to the preferred range, particularly before use of the composition. This can readily be done without causing premature polymerization by subjecting the composition to a reduced pressure. Thus, for example, by subjecting the composition to a pressure of 1 mm. at 20° C. for 5 minutes, the sulfur dioxide content is reduced to the preferred level.

One of the important uses for adhesive compositions embodying this invention is the bonding of rubber to metal, which has been a difficult problem heretofore and has necessitated the electroplating of the metal before bonding. In addition to the common materials, the adhesive compositions can be used for bonding a variety of synthetic materials such as nylon, cellulose ester films such as cellulose acetate and cellulose acetate butyrate, cellulose triacetate and the like, as well as polyester films, polysulfone ester films, and similar materials. The adhesive bond is usually formed in a period of from a few seconds to a few minutes.

Thus by means of this invention, adhesive compositions are provided which can be used almost universally, and which can be stored for prolonged periods of time without adverse effects. Since no special equipment is necessary, the adhesive compositions find utility in household applications, as well as a variety of industrial applications.

Although the invention has been described in detail with particular reference to certain preferred embodiments thereof, it will be understood that variations and modifications can be effected within the spirit and scope of the invention as described hereinabove, and as defined in the appended claims.

We claim:

1. An adhesive composition comprising a monomeric ester of α-cyanoacrylic acid having the formula

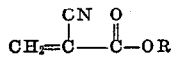

wherein R is a member of the group consisting of alkyl groups of 1 to 16 carbon atoms, a cyclohexyl group and a phenyl group and containing as a stabilizer a mixture of sulfur dioxide and from about 0.001% to about 0.05% by weight of hydroquinone based on the weight of said monomeric ester.

2. An adhesive composition comprising a monomeric ester of α-cyanoacrylic acid having the formula

wherein R is a member of the group consisting of alkyl groups of 1 to 16 carbon atoms, a cyclohexyl group and a phenyl group and containing as a stabilizer a mixture of from about 0.001% to about 0.01% by weight of sulfur dioxide and from about 0.001% to about 0.05% by weight of hydroquinone based on the weight of said monomeric ester.

3. An adhesive composition comprising a monomeric lower alkyl ester of α-cyanoacrylic acid stabilized with a mixture of sulfur dioxide and from about 0.001% to about 0.05% by weight of hydroquinone based on the weight of said monomeric ester.

4. An adhesive composition comprising a monomeric lower alkyl ester of α-cyanoacrylic acid stabilized with from about 0.001% to about 0.01% by weight of sulfur dioxide and from about 0.001% to about 0.05% by weight of hydroquinone based on the weight of said ester.

5. An adhesive composition consisting predominantly of monomeric methyl α-cyanoacrylate containing from about 0.001% to about 0.01% by weight of sulfur dioxide and from about 0.001% to about 0.05% by weight of hydroquinone.

6. An adhesive composition consisting predominantly of monomeric ethyl α-cyanoacrylate containing from about 0.001% to about 0.01% by weight of sulfur dioxide and from about 0.001% to about 0.05% by weight of hydroquinone.

7. An adhesive composition consisting predominantly of monomeric cyclohexyl α-cyanoacrylate containing from about 0.001% to about 0.01% by weight of sulfur dioxide and from about 0.001% to about 0.05% by weight of hydroquinone.

References Cited in the file of this patent

UNITED STATES PATENTS

| | | |
|---|---|---|
| 2,379,297 | Harmon et al. | June 26, 1945 |
| 2,467,926 | Ardis | Apr. 19, 1949 |
| 2,535,861 | Miller | Dec. 26, 1950 |
| 2,548,169 | Miller | Apr. 10, 1951 |